(12) United States Patent
Wu

(10) Patent No.: US 11,768,873 B2
(45) Date of Patent: Sep. 26, 2023

(54) METHOD, APPARATUS, ELECTRONIC DEVICE AND READABLE STORAGE MEDIUM FOR CLASSIFYING VIDEO

(71) Applicant: Beijing Baidu Netcom Science and Technology Co., Ltd., Beijing (CN)

(72) Inventor: Wenhao Wu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 223 days.

(21) Appl. No.: 17/338,263

(22) Filed: Jun. 3, 2021

(65) Prior Publication Data

US 2021/0357652 A1 Nov. 18, 2021

(30) Foreign Application Priority Data

Nov. 17, 2020 (CN) .......................... 202011286281.3

(51) Int. Cl.
G06F 16/75 (2019.01)
G06V 20/40 (2022.01)
G06V 10/56 (2022.01)
G06F 18/2413 (2023.01)
G06V 10/764 (2022.01)
G06V 10/82 (2022.01)

(52) U.S. Cl.
CPC .......... *G06F 16/75* (2019.01); *G06F 18/2413* (2023.01); *G06V 10/56* (2022.01); *G06V 10/764* (2022.01); *G06V 10/82* (2022.01); *G06V 20/41* (2022.01); *G06V 20/46* (2022.01)

(58) Field of Classification Search
CPC ..... G06F 16/75; G06F 18/2413; G06V 10/56; G06V 10/764; G06V 10/82; G06V 20/41; G06V 20/46; G06N 3/045; G06N 3/08
See application file for complete search history.

(56) References Cited

U.S. PATENT DOCUMENTS

| 11,074,791 | B2* | 7/2021 | Selinger ........... G08B 13/19602 |
| 11,257,226 | B1* | 2/2022 | Solh ........................ G06F 18/22 |
| 11,328,387 | B1* | 5/2022 | Kodavalla ............. G06T 3/4023 |
| 2019/0034734 | A1* | 1/2019 | Yen ...................... G06F 18/2413 |
| 2019/0188514 | A1* | 6/2019 | Saito ......................... H04N 5/91 |

(Continued)

FOREIGN PATENT DOCUMENTS

| CN | 110929780 A | 3/2020 |
| WO | 2020/088216 A1 | 5/2020 |

OTHER PUBLICATIONS

Zhao, Rui-Wei et al., "Learning Semantic Feature Map for Visual Content Recognition," Proceedings of the 25th ACM International Conference on Multimedia, ACMPUB27, New York, Ny (USA); pp. 1291-1299 (Oct. 19, 2017).

(Continued)

*Primary Examiner* — Santiago Garcia
(74) *Attorney, Agent, or Firm* — Kilpatrick Townsend & Stockton LLP

(57) ABSTRACT

A method, an apparatus, an electronic device and a computer readable storage medium for classifying a video are provided. The method may include: acquiring a to-be-classified video and an image complexity of the to-be-classified video; extracting a feature map with a resolution corresponding to the image complexity from the to-be-classified video; and determining a target video class to which the to-be-classified video belongs based on the feature map.

16 Claims, 3 Drawing Sheets

(56) References Cited

U.S. PATENT DOCUMENTS

| | | |
|---|---|---|
| 2020/0151497 A1 | 5/2020 | Kojima |
| 2020/0160528 A1* | 5/2020 | Rhodes .................. G06T 9/002 |
| 2022/0058822 A1* | 2/2022 | Naruniec .............. G06T 3/0006 |
| 2022/0101537 A1* | 3/2022 | Sun ......................... G06N 3/08 |
| 2022/0327804 A1* | 10/2022 | Meardi .................. B60L 53/30 |
| 2023/0044644 A1* | 2/2023 | Elbaz ..................... G06T 9/002 |

OTHER PUBLICATIONS

European Search Report dated Nov. 22, 2021 of corresponding European Patent Application No. 21177154.8 (nine pages).

\* cited by examiner

METHOD, APPARATUS, ELECTRONIC DEVICE AND READABLE STORAGE MEDIUM FOR CLASSIFYING VIDEO

CROSS-REFERENCE TO RELATED APPLICATIONS

This application claims the priority of Chinese Patent Application No. 202011286281.3, titled "METHOD, APPARATUS, ELECTRONIC DEVICE AND READABLE STORAGE MEDIUM FOR CLASSIFYING VIDEO", filed on Nov. 17, 2020, the content of which is incorporated herein by reference in its entirety.

TECHNICAL FIELD

The present disclosure relates to the field of artificial intelligence, in particular, to the technical fields of computer vision and deep learning, and more in particular, to a method, apparatus, electronic device and computer readable storage medium for classifying a video.

BACKGROUND

Based on the huge application potential in video surveillance, video recommendation, retrieval and the like, correct recognition and classification of videos is one of the most active research topics in the computer vision community. The two most important aspects of evaluating video classification methods are classification accuracy and reasoning cost. Currently, video recognition has achieved great success in recognition accuracy.

At present, video processing network structures are generally designed to be as lightweight as possible to improve the recognition efficiency.

SUMMARY

The present disclosure provides a method, apparatus, electronic device and computer readable storage medium for classifying a video.

In a first aspect, an embodiment of the present disclosure provides a method for classifying a video, including: acquiring a to-be-classified video and an image complexity of the to-be-classified video; extracting a feature map with a resolution corresponding to the image complexity from the to-be-classified video; and determining a target video class to which the to-be-classified video belongs based on the feature map.

In a second aspect, an embodiment of the present disclosure provides an apparatus for classifying a video, including: a video and image complexity acquisition unit configured to acquire a to-be-classified video and an image complexity of the to-be-classified video; a feature map extraction unit configured to extract a feature map with a resolution corresponding to the image complexity from the to-be-classified video; and a target video class determination unit, configured to determine a target video class to which the to-be-classified video belongs based on the feature map.

In a third aspect, an embodiment of the present disclosure provides an electronic device, including: at least one processor; a memory communicatively connected with the at least one processor, where the memory stores instructions executable by the at least one processor, and the instructions, when executed by the at least one processor, cause the at least one processor to implement the method for classifying a video as described in any one of the implementations of the first aspect.

In a fourth aspect, an embodiment of the present disclosure provides a non-transitory computer readable storage medium storing computer instructions, where the computer instructions cause a computer to implement the method for classifying a video as described in any one of the implementations of the first aspect.

According to the method, apparatus, electronic device and computer readable storage medium for classifying a video provided by the embodiments of the present disclosure, the to-be-classified video and the image complexity of the to-be-classified video are first acquired; then, the feature map with the resolution corresponding to the image complexity is extracted from the to-be-classified video; and finally, the target video class to which the to-be-classified video belongs is determined based on the feature map.

It should be appreciated that the content described in this section is not intended to identify the key or critical features of embodiments of the present disclosure, nor is it intended to limit the scope of the present disclosure. The other features of the present disclosure will become easy to understand through the following description.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are illustrated in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
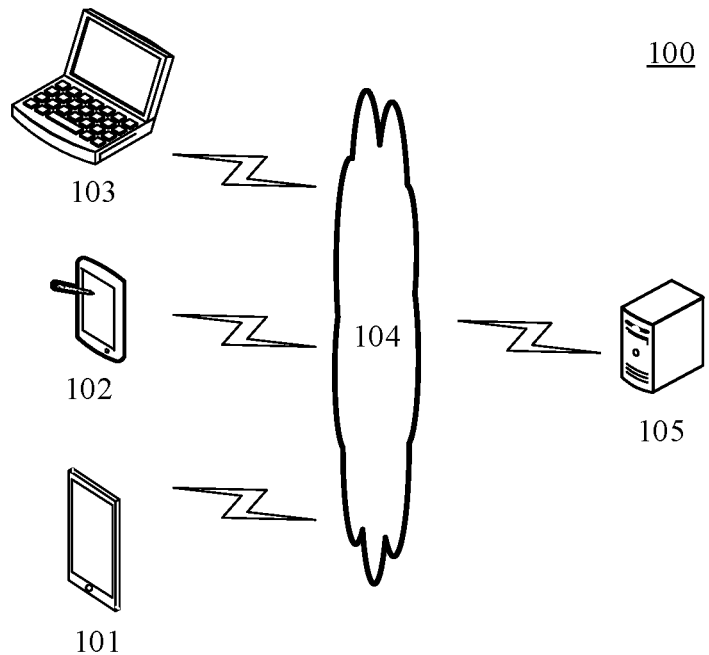
FIG. 1 is an example system architecture to which the present disclosure may be applied.

FIG. 1 illustrates an example system architecture 100 to which an embodiment of a method, apparatus, electronic device and computer readable storage medium for calibrating a video according to the present disclosure may be applied.

As illustrated in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

A user may use the terminal devices 101, 102, 103 to interact with the server 105 through the network 104 to receive or send messages. Various applications for implementing information communication between the terminal devices 101, 102, 103 and the server 105, such as video classification applications, video search applications and instant messaging tools, may be installed on the terminal devices 101, 102, 103 and the server 105.

The terminal devices 101, 102, 103 and the server 105 may be hardware or software. When the terminal devices 101, 102, 103 are hardware, the terminal devices 101, 102, 103 may be various electronic devices having a display screen, including but not limited to a smart phone, a tablet computer, a laptop computer and a desktop computer. When the terminal devices 101, 102, 103 are software, the terminal devices 101, 102, 103 may be installed in the electronic devices, and may be implemented as multiple software pieces or software modules, or as a single software piece or software module. It is not specifically limited here. When the server 105 is hardware, the server 105 may be implemented as a distributed server cluster composed of multiple servers, or as a single server. When the server 105 is software, the server 105 may be implemented as multiple software pieces or software modules, or as a single software piece or software module. It is not specifically limited here.

The server 105 may provide various services through various built-in applications. Taking a video classification application that may provide a video classification service as an example, the server 105 may achieve the following effects when running the video classification application: a to-be-classified video transmitted by the terminal devices 101, 102, 103 through the network 104 is first received and an image complexity of the to-be-classified video is calculated; then, a feature map with a resolution corresponding to the image complexity is extracted from the to-be-classified video; and finally, a target video class to which the to-be-classified video belongs is determined based on the feature map. Further, the server 105 may alternatively feed back the determined target video class to the user, or classify the to-be-classified video into the target video class.

It should be noted that the to-be-classified video may be acquired in real time from the terminal devices 101, 102, 103 through the network 104, and may be alternatively pre-stored locally at the server 105 in various ways. Therefore, when the server 105 detects that the data is stored locally (for example, a pending video classification task stored before the start of processing), the server may choose to acquire the data directly from the local. In this case, the example system architecture 100 may alternatively not include the terminal device 101, 102, 103 and the network 104.

Since determining the classification of the video according to the image content of the video requires lots of computing resources and strong computing capabilities, and the method for classifying a video provided in the subsequent embodiments of the present disclosure is generally executed by the server 105 with lots of computing resources and a strong computing capability, and accordingly, the apparatus for classifying a video is also generally arranged in the server 105. However, it should be noted that, when the terminal devices 101, 102, 103 alternatively have the computing resources and the computing capabilities that meet the requirements, the terminal devices 101, 102, 103 may complete the computing, which is generally executed by the server 105, through the video classification application installed on the terminal devices 101, 102, 103, thereby outputting the same result as that of the server 105. Particularly, in the case where there are multiple terminal devices with different computing capabilities, and when the video classification application determines that the terminal devices on which the video classification application is installed have strong computing capabilities and lots of computing resources, the terminal devices may execute the computing, thereby reducing the computing amount of the server 105, and correspondingly, the apparatus for classifying a video is also generally provided in the terminal devices 101, 102, 103. In this case, the example system architecture 100 may alternatively not include the server 105 and the network 104.

It should be appreciated that the number of the terminal devices, the network and the server in FIG. 1 is merely illustrative. Any number of terminal devices, networks and servers may be provided according to actual requirements.

Figure 2:
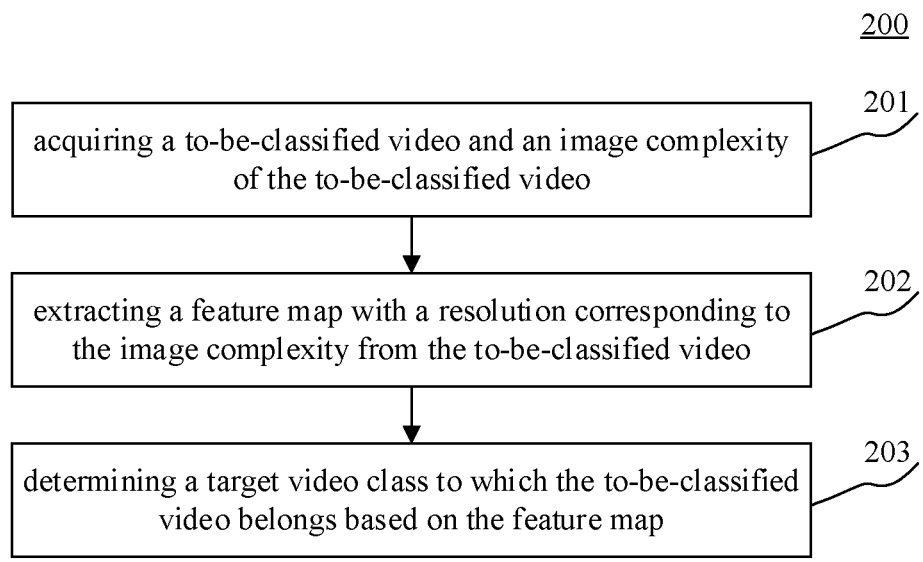
FIG. 2 is a flowchart of a method for classifying a video according to an embodiment of the present disclosure.

Referring to FIG. 2, FIG. 2 is a flowchart of a method for classifying a video according to an embodiment of the present disclosure. The flow 200 includes steps 201 to 203.

Step 201 includes acquiring a to-be-classified video and an image complexity of the to-be-classified video.

This step is intended to acquire the to-be-classified video and the image complexity of the to-be-classified video by an execution body of the method for classifying a video (such as the server 105 illustrated in FIG. 1).

The to-be-classified video may be acquired from multiple channels, for example, the data uploaded by a user through an intelligent terminal (for example, the terminal devices 101, 102, 103 illustrated in FIG. 1) may be received in real time, and the to-be-classified video may be alternatively found in the local storage space by the execution body according to an indication signal transmitted by the user, and the to-be-classified video may be alternatively downloaded from the network space according to a network address or a network link transmitted by the user. Further, when it is determined whether the to-be-classified video is stored locally, the to-be-classified video may be retrieved based on a feature code of a hash algorithm, and when the to-be-classified video being stored locally is retrieved, the to-be-classified video is directly acquired locally, thereby avoiding waste of traffic and time.

Further, the to-be-classified video may be a complete video, may be a video segment taken from a complete video, or may be combined with a definition (for example, the duration of the to-be-classified video may not exceed 15 seconds and the like) of the to-be-classified video in an actual application scenario.

The image complexity of the to-be-classified video refers to the color complexity of the image content appearing in the to-be-classified video, such as the number of colors, the distribution area of each color, the uniformity degree or the disorder degree of the distribution, and the proportion of noise points. In brief, a video with more colors per unit area and a higher disorder degree of colors, has a higher image complexity. Specifically, when determining the image complexity of the to-be-classified video, the definition (for example, whether there is an additional influence factor, and a weight of each influence factor or the like) of the image complexity in an actual application scenario may be combined to finally determine the accurate image complexity. Further, the image complexity may be obtained by statistics according to a preset rule. Alternatively, a deep learning model may be obtained by training using a training sample and a standard result of the image complexity of the sample which complies with a preset rule, so that the deep learning model has the ability to output the image complexity of the input to-be-classified video.

Step 202 includes extracting a feature map with a resolution corresponding to the image complexity from the to-be-classified video.

On the basis of step 201, this step is intended to extract the feature map with the resolution corresponding to the image complexity from the to-be-classified video by the execution body. In brief, the higher the image complexity of the to-be-classified video is, the higher the resolution of the feature map extracted from the to-be-classified video is, correspondingly, the lower the image complexity of a to-be-classified video is, the lower the resolution of the feature map extracted from the to-be-classified video is, that is, the resolution of the extracted feature map is proportional to the image complexity.

It should be appreciated that each frame of images included in the to-be-classified video with a higher image complexity will contain image features that are more difficult to be analyzed, and therefore, in order to ensure the accuracy of the feature analysis, it is necessary to increase the resolution of the feature map used for the feature analysis in a subsequent step, because the feature map with a higher resolution include more details, and each frame of images included in the to-be-classified video with a lower image complexity will contain less or easily extracted image features, and therefore, the accuracy may also be ensured when the subsequent analysis is performed using the feature map with a lower resolution.

Step 203 includes determining a target video class to which the to-be-classified video belongs based on the feature map.

On the basis of step 202, this step is intended to determine the target video class to which the to-be-classified video belongs based on the feature map by the execution body.

It should be appreciated that in the process of achieving the purpose of video classification through a deep learning network, the extraction of the feature map is only a preliminary step of the complete data processing process, that is, after the feature map is extracted, processing of structures such as a convolutional layer, a pooling layer and a fully connected layer may be required to finally output the result of the target video class to which the to-be-classified video belongs.

Further, after determining the target video class to which the to-be-classified video belongs, multiple subsequent processes may be performed according to actual requirements of the user. For example, when the user instructs to query other videos in the same class as the to-be-classified video, other videos belonging to the target video class may be returned to the user. When the user queries other videos similar to the to-be-classified video, the search scope of the similar videos may be reduced through the target video class. When the user only provide the updated to-be-classified video, the classification group of the uploaded video in the user video space may be automatically generated according to the recognized video class, thereby achieving the arrangement of the user uploaded video and the like. Further, the activity information of the corresponding class may be pushed to the user by performing statistics on the classes of videos uploaded to the system over a period of time or on all classes of the videos.

Different from the existing technology that focuses on the design of more lightweight network structures, the method for classifying a video provided by the embodiment of the present disclosure aims at the improvement direction of the efficiency difference of the deep learning network in processing the to-be-classified videos with different image complexities. Although the existing technology obtains the lightweight network structures, the to-be-classified videos with different image complexities are treated equally, that is, when processing the to-be-classified videos with different image complexities, the feature matching and recognition are performed based on the extracted feature maps with the same resolution. According to the present disclosure, the feature maps with the resolutions corresponding to the image complexities of the to-be-classified videos are extracted from the to-be-classified videos according to the difficulty degrees of recognizing the image features of the to-be-classified videos with different image complexities, and the feature maps with low resolutions significantly improve the efficiency of subsequent feature recognition and classification based on the feature maps with low resolutions, thereby improving the classification efficient of the whole videos.

Figure 3:
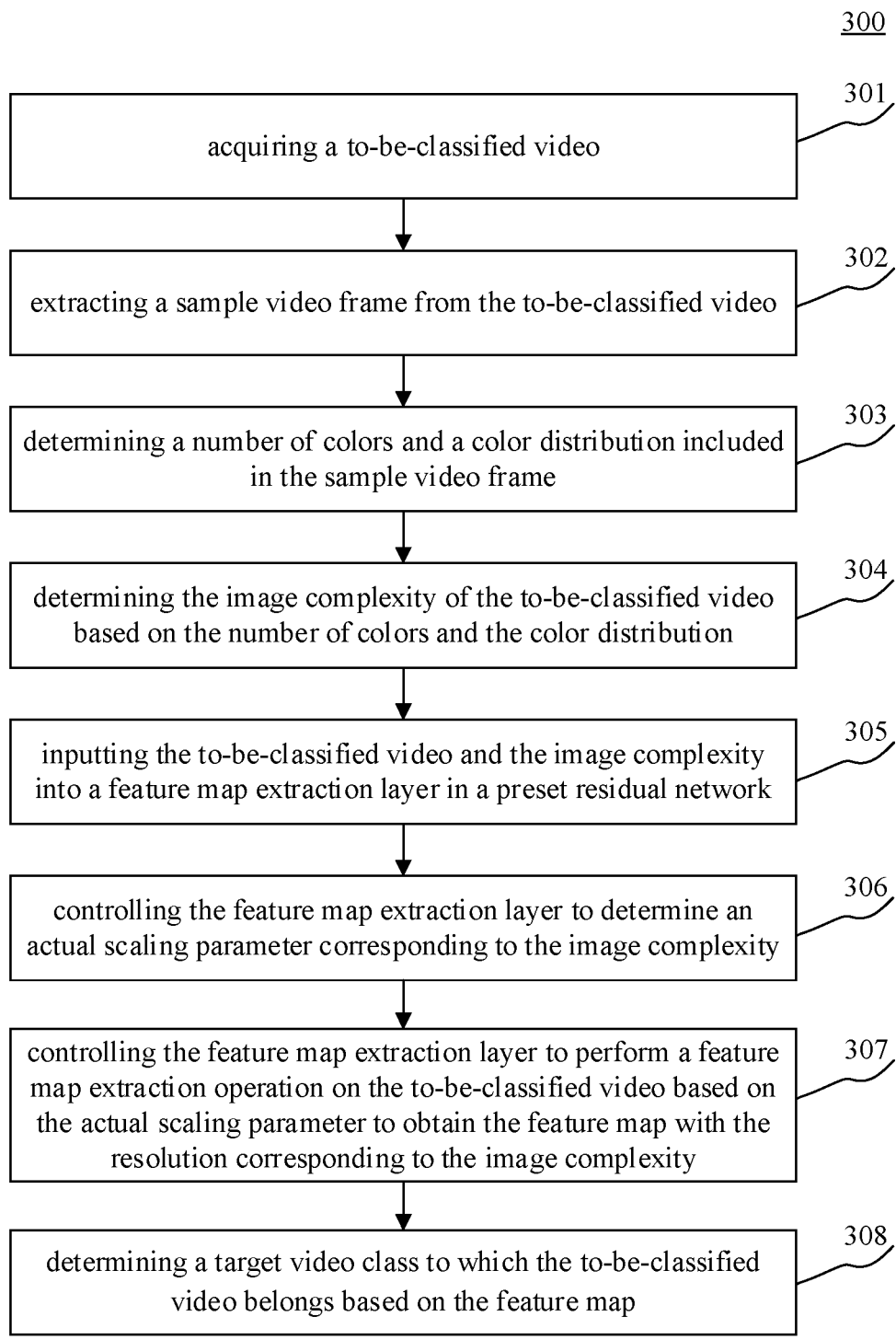
FIG. 3 is another flowchart of the method for classifying a video according to an embodiment of the present disclosure.

Referring to FIG. 3, FIG. 3 is another flowchart of the method for classifying a video according to an embodiment of the present disclosure. The flow 300 includes step 301 to 308.

Step 301 includes acquiring a to-be-classified video.

Step 302 includes extracting a sample video frame from the to-be-classified video.

Step 303 includes determining a number of colors and a color distribution included in the sample video frame.

Step 304 includes determining the image complexity of the to-be-classified video based on the number of colors and the color distribution.

In this embodiment, it is required that the image complexity is proportional to the number of colors, and is proportional to a disorder degree of the color distribution. That is, the more the number of colors is, the higher the image complexity is, and the more disorder the color distribution is, the higher the image complexity is.

Steps 302 to 304 provide a specific schema for determining the image complexity of the to-be-classified video, that is, some representative sample video frames are extracted from the to-be-classified video, and the image complexity of the to-be-classified video is determined based on the statistics of the number of colors and the color distribution. The sample video frames may be video frames extracted at a fixed time and position, or may include a video cover frame. Alternatively, statistics may be first performed on a certain feature of all the sample video frames to select some representative frames from all the sample video frames. A specific implementation is not limited to, and may be flexibly selected according to all possible requirements in an actual application scenario.

Step 305 includes inputting the to-be-classified video and the image complexity into a feature map extraction layer in a preset residual network.

On the basis of step 304, this step is intended to input by the execution body the acquired to-be-classified video and the image complexity as input data into the feature map extraction layer in the preset residual network. That is, in this embodiment, a trained residual network is used to achieve the classification of the to-be-classified video. Compared with a conventional convolutional neural network, the residual network may effectively avoid the gradient disappearing problem and the over-fitting problem caused by the increasing layers, thereby ensuring the accuracy of the output result.

Step 306 includes controlling the feature map extraction layer to determine an actual scaling parameter corresponding to the image complexity.

The feature map extraction layer records corresponding relationships between different image complexities and different scaling parameters.

On the basis of step 305, this step is intended to control by the execution body the feature map extraction layer to determine the actual scaling parameter corresponding to the image complexity, that is, the actual scaling parameter corresponding to an actual image complexity is found by using the corresponding relationships recorded in the feature map extraction layer. The scaling parameter is used to determine what is the resolution of the feature map to be extracted, and a basic resolution may be set at the same time, so as to facilitate adjustment of the resolution in combination with the scaling parameter.

Step 307 includes controlling the feature map extraction layer to perform a feature map extraction operation on the to-be-classified video based on the actual scaling parameter to obtain the feature map with the resolution corresponding to the image complexity.

On the basis of step 306, this step is intended to control by the execution body the feature map extraction layer to perform the feature map extraction operation on the to-be-classified video based on the actual scaling parameter to obtain the feature map with the resolution corresponding to the image complexity.

Step 308 includes determining a target video class to which the to-be-classified video belongs based on the feature map.

Steps 301 and 308 in this embodiment are the same as steps 201 and 203 illustrated in FIG. 2, respectively. For the contents of the same parts, please refer to the corresponding parts of the previous embodiment, which are not repeated here.

On the basis of the previous embodiment, this embodiment provides a specific implementation composed of steps 302 to 304 for the obtaining the image complexity in step 201 of the flow 200, that is, the accurate image complexity is quickly and conveniently obtained by statistics of the number of colors and the color distribution of a few representative sample video frames of the to-be-classified video. A specific implementation composed of steps 305 to 307 is provided for step 202 of the flow 200, that is, the data is processed by using the residual network including the feature map extraction layer recording the corresponding relationship between different image complexities and different scaling parameters, and the actual scaling parameter corresponding to the actual image complexity is accurately determined through the corresponding relationships, and then the feature map with the corresponding resolution is extracted from the to-be-classified video with the help of the actual scaling parameter. The residual network may avoid the gradient disappearing problem easily caused by the increasing layers, thereby improving the accuracy of the result.

It should be appreciated that there is no causal and dependent relationship between the scheme for acquiring the image complexity provided in steps 302 to 302 and the scheme for extracting the feature map with the resolution corresponding to the image complexity provided in steps 305 to 307, and therefore, these two preferred schemes may each be combined with the previous embodiment to form an independent embodiment, and the present embodiment is only a preferred embodiment including both the two preferred schemes.

On the basis of the previous embodiments, in order to deepen understanding of the feature map extraction layer, the following further provides a feature map training scheme including, but not limited to:

first acquiring a sample video image and a true classification label of the sample video image; then using the sample video image and the true classification label as an input training sample, and using L2 loss function to perform iterative training on an upper limit and a lower limit of an initial scaling parameter until a result converges to obtain a trained scaling parameter; and finally generating the feature map extraction layer based on the trained scaling parameter.

The L2 loss function, also referred to as the L2 normal form loss function, assumes that model parameters meet the Gaussian distribution, and the normal form is a constraint on the parameter, so that the model does not overfit. The L2 loss function is chosen because a good effect may be achieved in this scenario.

In addition to the training schema described above, other loss functions may be used according to actual requirements. At the same time, in order to further improve the training effect, the upper limit and the lower limit of the current scaling parameter may be adjusted by using the stochastic gradient descent mechanism during the iterative training, so that during each iterative training, an unfixed adjustment of the upper limit and the lower limit of the parameter may be obtained through the stochastic gradient descent mechanism to enhance randomness.

Figure 4:
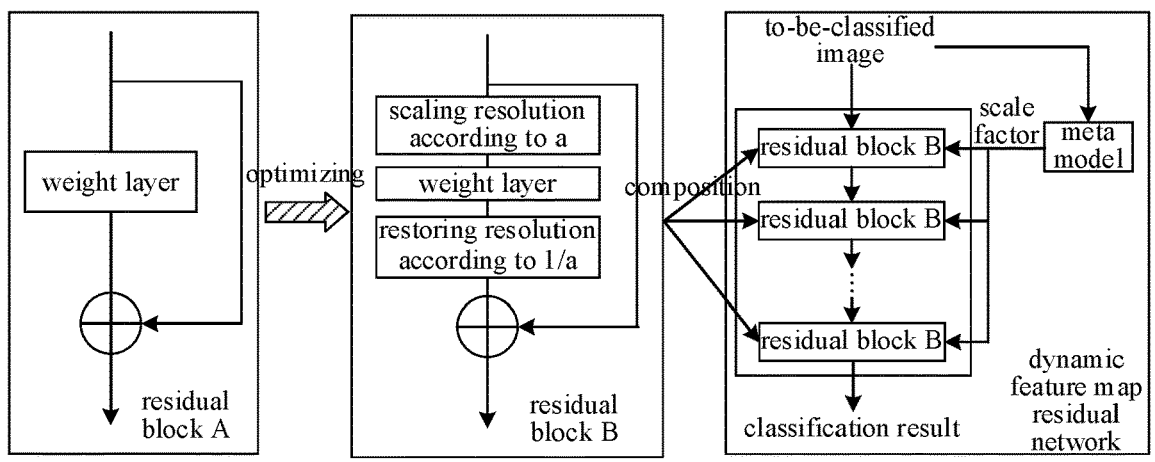
FIG. 4 is a flowchart of the method for classifying a video in an application scenario according to an embodiment of the present disclosure.

For further understanding, the present disclosure further provides a specific implementation scheme in combination with a specific application scenario, referring to the schematic diagram illustrated in FIG. 4.

The left side of FIG. 4 illustrates a residual block (i.e., residual block A) in a conventional residual network, and the middle of FIG. 4 illustrates a residual block (i.e., residual block B) of a residual network for which the effect of a dynamic scaling parameter is added according to the present disclosure based on the above technical schemes, which may also be referred to as a dynamic resolution residual block. Specifically, a scaling parameter a is a learnable parameter that represents a yardstick for scaling the resolution of the feature image of the input residual block, that is, the feature map is scaled before the feature map is input into a weight layer (that is, the resolution is scaled according to a), and the resolution is restored to the original size (that is, the resolution is restored according to 1/a) after the feature map is output from the weight layer, and further, multiple dynamic residual blocks (residual blocks B) are stacked to obtain the dynamic residual network on the right side of FIG. 4 (that is, the preset residual network including the feature map extraction layer described in the previous embodiments of the present disclosure).

Before the dynamic residual network is actually used, the following processes are required:

1) training: an image sequence of a video and a true label corresponding to the video are input, and K frames are first randomly sampled and input into the dynamic residual network to obtain a classification cross entropy loss function, and at the same time the L2 norm is performed on the scaling parameter a of all the dynamic residual blocks to obtain the L2 loss function, and then the two loss functions are optimized by using the stochastic gradient descent, and the network weight layer and the scaling parameter a are continuously updated until the loss converges, and the training stops; and 2) testing: the scaling parameter a and a parameter of the network weight layer in the network are obtained through training, and a video image sequence is input, and a part of frames are uniformly sampled from the video image sequence and input into the network, and the prediction results of the frames are aggregated, so that a prediction result of a video level may be directly obtained. When the accuracy of the prediction result is higher than the preset accuracy, the trained network may be considered to be in an available state.

In practice, the following example may be presented.

It is assumed that there are 10 to-be-classified videos, the quantized image complexities of the 10 to-be-classified videos are from 1 to 10 (1 is the lower limit of the complexities and 10 is the upper limit of the complexities), and it is assumed that 1 to 5 belong to low image complexities and 6 to 10 belong to high image complexities.

1) A server receives the 10 to-be-classified videos and sequentially inputs the 10 to-be-classified videos into a preset dynamic residual network.

2) The dynamic residual network labels five videos with image complexities between 1 and 5 as videos as low complexities and five videos with image complexities between 6-10 as videos with high complexities according to built-in dynamic residual blocks.

5 may be set as a preset complexity, and a video with a complexity that is higher than the preset complexity is determined as a video with a high complexity, and a video with a complexity that is smaller than or equal to the present complexity is determined a video with a low complexity.

3) The dynamic residual network scales the videos with the low complexities to ¼ of a basic resolution to obtain feature maps with a first resolution.

When the basic resolution is 2000*1600, the first resolution is 500*400.

4) The dynamic residual network scales the videos with the high complexities based on the basic resolution to obtain feature maps with a second resolution.

5) The server receives 10 target video class output by the dynamic residual network based on the 5 feature maps with the first resolution and the 5 feature maps with the second resolution.

It can be seen that in the 10 to-be-classified videos, a half of the to-be-classified videos participate the subsequent data processing and conclusion based on the feature maps with ¼ of a default resolution, so that the overall computing complexity is reduced by at least a half without affecting the accuracy of the result, and the overall classification efficiency is improved.

Figure 5:
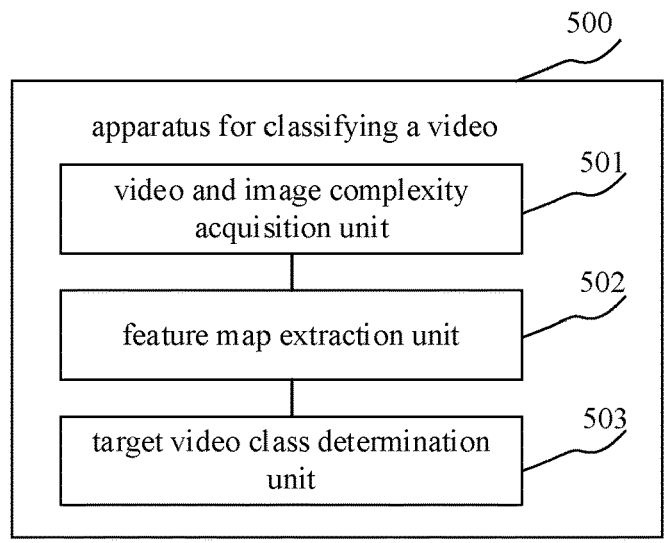
FIG. 5 is a block diagram of an apparatus for classifying a video according to an embodiment of the present disclosure.

Further referring to FIG. 5, as an implementation of the method illustrated in each of the above figures, the present disclosure provides an embodiment of an apparatus for classifying a video. The embodiment of the apparatus corresponds to the embodiment of the method illustrated in FIG. 2, and the apparatus is particularly applicable to various electronic devices.

As illustrated in FIG. 5, the apparatus 500 for classifying a video of this embodiment includes: a video and image complexity acquisition unit 501, a feature map extraction unit 502 and a target video class determination unit 503. The video and image complexity acquisition unit 501 is configured to acquire a to-be-classified video and an image complexity of the to-be-classified video; the feature map extraction unit 502 is configured to extract a feature map with a resolution corresponding to the image complexity from the to-be-classified video; and the target video class determination unit 503 is configured to determine a target video class to which the to-be-classified video belongs based on the feature map.

In this embodiment, the specific processing of the video and image complexity acquisition unit 501, the feature map extraction unit 502 and the target video class determination unit 503 of the apparatus 500 for classifying a video and the technical effects thereof may be described with reference to the related description of steps 201 to 203 in the embodiment corresponding to FIG. 2, and are thus not repeated here.

In some alternative implementations of this embodiment, the video and image complexity acquisition unit 501 includes an image complexity acquisition subunit configured to acquire the image complexity of the to-be-classified video, and the image complexity acquisition subunit is further configured to:

extract a sample video frame from the to-be-classified video;

determine a number of colors and a color distribution included in the sample video frame; and determine the image complexity of the to-be-classified video based on the number of colors and the color distribution, where the image complexity is proportional to the number of colors, and is proportional to a disorder degree of the color distribution.

In some alternative implementations of this embodiment, the feature map extraction unit 502 is further configured to:

input the to-be-classified video and the image complexity into a feature map extraction layer in a preset residual network;

control the feature map extraction layer to determine an actual scaling parameter corresponding to the image complexity, where the feature map extraction layer records corresponding relationships between different image complexities and different scaling parameters; and control the feature map extraction layer to perform a feature map extraction operation on the to-be-classified video based on the actual scaling parameter to obtain the feature map with the resolution corresponding to the image complexity.

In some alternative implementations of this embodiment, the apparatus 500 for classifying a video further including a feature map extraction layer training unit configured to train the feature map extraction layer, and the feature map extraction layer training unit is further configured to:

acquire a sample video image and a true classification label of the sample video image;

use the sample video image and the true classification label as an input training sample, and use an L2 loss function to perform iterative training on an upper limit and a lower limit of an initial scaling parameter until a result converges to obtain a trained scaling parameter; and generate the feature map extraction layer based on the trained scaling parameter.

In some alternative implementations of this embodiment, the feature map extraction layer training unit further includes:

an optimization adjustment subunit configured to use a stochastic gradient descent mechanism to adjust an upper limit and a lower limit of a current scaling parameter during the iterative training.

In some alternative implementations of this embodiment, the feature map extraction unit 502 includes:

a low resolution feature map extraction subunit configured to extract a feature map with a first resolution from the to-be-classified video, in response to the image complexity being lower than a preset complexity; and a high resolution feature map extraction subunit, configured to extract a feature map with a second resolution from the to-be-classified video, in response to the image complexity being not lower than a preset complexity, where the second resolution is higher than the first resolution.

This embodiment exists as the embodiment of the apparatus corresponding to the embodiment of the method. Different from the existing technology that focuses on the design of more lightweight network structures, the apparatus for classifying a video provided by the embodiment of the present disclosure aims at the improvement direction of the efficiency difference of the deep learning network in processing the to-be-classified videos with different image complexities. Although the existing technology obtains the lightweight network structures, the to-be-classified videos with different image complexities are treated equally, that is, when processing the to-be-classified videos with different image complexities, the feature matching and recognition are performed based on the extracted feature maps with the same resolution. According to the present disclosure, the feature maps with the resolutions corresponding to the image complexity of the to-be-classified videos are extracted from the to-be-classified videos according to the difficulty degree of recognizing the image features of the to-be-classified videos with different image complexities, and the feature maps with low resolutions significantly improve the efficiency of the subsequent feature recognition and classification based on the feature maps with low resolutions, thereby improving the classification efficient of the whole videos.

According to an embodiment of the present disclosure, the present disclosure further provides an electronic device and a computer readable storage medium.

Figure 6:
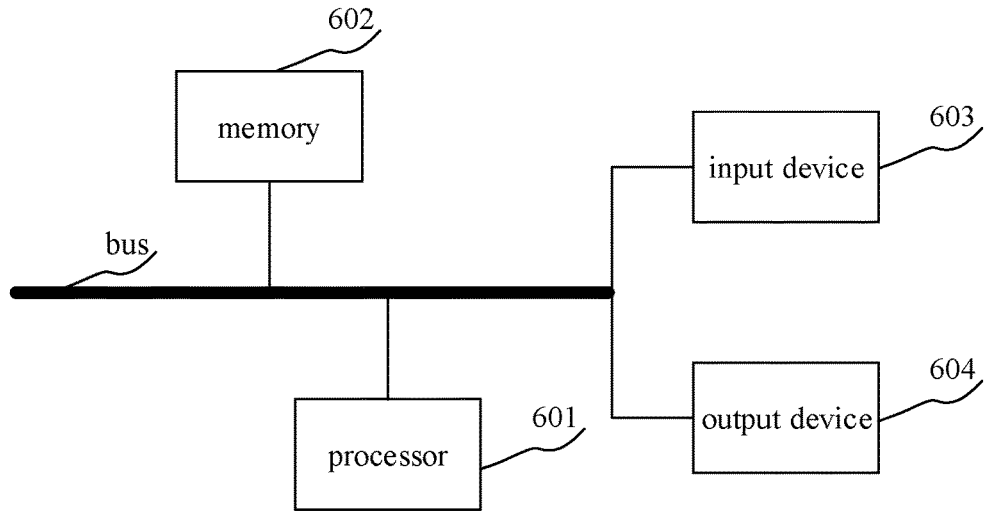
FIG. 6 is a schematic structural diagram of an electronic device adapted to execute the method for classifying a video according to an embodiment of the present disclosure.

FIG. 6 is a block diagram of an electronic device adapted to implement the method for classifying a video according to an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions illustrated herein are examples only, and are not intended to limit the implementations of the present disclosure as described and/or claimed herein.

As illustrated in FIG. 6, the electronic device includes one or more processors 601, a memory 602 and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and the electronic device provides some of the necessary operations. An example of a processor 601 is illustrated in FIG. 6.

The memory 602 is a non-transitory computer readable storage medium according to the present disclosure. The memory stores instructions executable by at least one processor to cause the at least one processor to execute the method for classifying a video according to the present disclosure. The non-transitory computer readable storage medium of the present disclosure stores computer instructions for causing a computer to execute the method for classifying a video according to the present disclosure.

As a non-transitory computer readable storage medium, the memory 602 may be used to store non-transitory software programs, non-transitory computer executable programs and modules, such as the program instructions or modules corresponding to the method for classifying a video in the embodiment of the present disclosure (for example, the video and image complexity acquisition unit 501, the feature map extraction unit 502 and the target video class determination unit 503 illustrated in FIG. 5). The processor 601 runs the non-transitory software programs, instructions and modules stored in the memory 602 to execute various functional applications and data processing of the server, thereby implementing the method for classifying a video in the embodiment of the method.

The memory 602 may include a storage program area and a storage data area, where the storage program area may store an operating system and an application program required by at least one function; and the storage data area may store data created by the electronic device when executing the method for classifying a video. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for classifying a video. Examples of such networks include, but are not limited to, the Internet, enterprise intranets, local area networks, mobile communication networks and combinations thereof.

The electronic device adapted to execute the method for classifying a video may further include an input device 603 and an output device 604. The processor 601, the memory 602, the input device 603 and the output device 604 may be interconnected through a bus or other means, and an example of a connection through the bus is illustrated in FIG. 6.

The input device 603 may receive input digit or character information, and generate key signal input related to user settings and functional control of the electronic device adapted to execute the method for classifying a video, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computing system may include a client and a server. The client and the server are typically remote from each other and typically interact through a communication network. The relationship between the client and the server is generated by a computer program running on the corresponding computer and having a client-server relationship with each other. The server may be a cloud server, also known as a cloud computing server or a cloud host, which is a host product in the cloud computing service system and may solve the defects of difficult management and weak service scalability existing in a conventional physical host and a Virtual Private Server service.

Different from the existing technology that focuses on the design of more lightweight network structures, the embodiments of the present disclosure aim at the improvement direction of the efficiency difference of the deep learning network in processing the to-be-classified videos with different image complexities. Although the existing technology obtains the lightweight network structures, the to-be-classified videos with different image complexities are treated equally, that is, when processing the to-be-classified videos with different image complexities, the feature matching and recognition are performed based on the extracted feature maps with the same resolution. According to the present disclosure, the feature maps with the resolutions corresponding to the image complexity of the to-be-classified videos are extracted from the to-be-classified videos according to the difficulty degree of recognizing the image features of the to-be-classified videos with different image complexities, and the feature maps with low resolutions significantly improve the efficiency of the subsequent feature recognition and classification based on the feature maps with low resolutions, thereby improving the classification efficient of the whole videos.

It should be appreciated that the steps of reordering, adding or deleting may be executed using the various forms illustrated above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for classifying a video, the method comprising:
    acquiring a to-be-classified video and an image complexity of the to-be-classified video, wherein the image complexity of the to-be-classified video comprises a number of colors per unit area of image content of the to-be-classified video;
    extracting a feature map with a resolution corresponding to the image complexity from the to-be-classified video, wherein extracting the feature map with the resolution corresponding to the image complexity from the to-be-classified video comprises:
        determining that the image complexity of the to-be-classified video is lower than a preset complexity, wherein the preset complexity comprises a preset number of colors per unit area greater than the number of colors per unit area of image content of the to-be-classified video; and
        reducing the resolution of the to-be-classified video in response to determining that the number of colors per unit area of image content of the to-be-classified video is smaller than the preset number of colors per unit area; and
    determining a target video class to which the to-be-classified video belongs based on the feature map.

2. The method according to claim 1, wherein acquiring the image complexity of the to-be-classified video comprises:
    extracting a sample video frame from the to-be-classified video;
    determining a number of colors and a color distribution comprised in the sample video frame; and determining the image complexity of the to-be-classified video based on the number of colors and the color distribution of the sample video frame, wherein the image complexity is proportional to the number of colors of the sample video frame, and is proportional to a disorder degree of the color distribution of the sample video frame.

3. The method according to claim 1, wherein extracting the feature map with the resolution corresponding to the image complexity from the to-be-classified video comprises:
inputting the to-be-classified video and the image complexity into a feature map extraction layer in a preset residual network;
controlling the feature map extraction layer to determine an actual scaling parameter corresponding to the image complexity, wherein the feature map extraction layer records corresponding relationships between different image complexities and different scaling parameters; and
controlling the feature map extraction layer to perform a feature map extraction operation on the to-be-classified video based on the actual scaling parameter to obtain the feature map with the resolution corresponding to the image complexity.

4. The method according to claim 3, further comprising:
training the feature map extraction layer, wherein the training comprises:
acquiring a sample video image and a true classification label of the sample video image;
using the sample video image and the true classification label as an input training sample;
using an L2 loss function to perform iterative training on an upper limit and a lower limit of an initial scaling parameter until a result converges to obtain a trained scaling parameter; and
generating the feature map extraction layer based on the trained scaling parameter.

5. The method according to claim 4, further comprising:
using a stochastic gradient descent mechanism to adjust an upper limit and a lower limit of a current scaling parameter during the iterative training.

6. An electronic device, comprising:
at least one processor; and
a memory communicatively connected with the at least one processor, wherein the memory stores instructions executable by the at least one processor, and the instructions, when executed by the at least one processor, cause the at least one processor to perform operations comprising:
acquiring a to-be-classified video and an image complexity of the to-be-classified video, wherein the image complexity of the to-be-classified video comprises a number of colors per unit area of image content of the to-be-classified video;
extracting a feature map with a resolution corresponding to the image complexity from the to-be-classified video, wherein extracting the feature map with the resolution corresponding to the image complexity from the to-be-classified video comprises:
determining that the image complexity of the to-be-classified video is lower than a preset complexity, wherein the preset complexity comprises a preset number of colors per unit area greater than the number of colors per unit area of image content of the to-be- classified video; and
reducing the resolution of the to-be-classified video in response to determining that the number of colors per unit area of image content of the to-be-classified video is smaller than the preset number of colors per unit area; and
determining a target video class to which the to-be-classified video belongs based on the feature map.

7. The electronic device according to claim 6, wherein acquiring the image complexity of the to-be-classified video comprises:
extracting a sample video frame from the to-be-classified video;
determining a number of colors and a color distribution comprised in the sample video frame; and
determining the image complexity of the to-be-classified video based on the number of colors and the color distribution of the sample video frame, wherein the image complexity is proportional to the number of colors of the sample video frame and is proportional to a disorder degree of the color distribution of the sample video frame.

8. The electronic device according to claim 6, wherein extracting the feature map with the resolution corresponding to the image complexity from the to-be-classified video comprises:
inputting the to-be-classified video and the image complexity into a feature map extraction layer in a preset residual network;
controlling the feature map extraction layer to determine an actual scaling parameter corresponding to the image complexity, wherein the feature map extraction layer records corresponding relationships between different image complexities and different scaling parameters; and
controlling the feature map extraction layer to perform a feature map extraction operation on the to-be-classified video based on the actual scaling parameter to obtain the feature map with the resolution corresponding to the image complexity.

9. The electronic device according to claim 8, wherein the operations further comprise:
acquiring a sample video image and a true classification label of the sample video image;
using the sample video image and the true classification label as an input training sample;
using an L2 loss function to perform iterative training on an upper limit and a lower limit of an initial scaling parameter until a result converges to obtain a trained scaling parameter; and
generating the feature map extraction layer based on the trained scaling parameter.

10. The electronic device according to claim 9, wherein the operations further comprise:
using a stochastic gradient descent mechanism to adjust an upper limit and a lower limit of a current scaling parameter during the iterative training.

11. A non-transitory computer-readable storage medium storing computer instructions, wherein the computer instructions, when executed by a computer, cause the computer to perform operations comprising:
acquiring a to-be-classified video and an image complexity of the to-be-classified video wherein the image complexity of the to-be-classified video comprises a number of colors per unit area of image content of the to-be-classified video;
extracting a feature map with a resolution corresponding to the image complexity from the to-be-classified video, wherein extracting the feature map with the resolution corresponding to the image complexity from the to-be-classified video comprises:
  determining that the image complexity of the to-be-classified video is lower than a preset complexity, wherein the preset complexity comprises a preset number of colors per unit area greater than the number of colors per unit area of image content of the to-be- classified video; and
  reducing the resolution of the to-be-classified video in response to determining that the number of colors per unit area of image content of the to-be-classified video is smaller than the preset number of colors per unit area; and
determining a target video class to which the to-be-classified video belongs based on the feature map.

12. The non-transitory computer-readable storage medium according to claim 11, wherein acquiring the image complexity of the to-be-classified video comprises:
  extracting a sample video frame from the to-be-classified video;
  determining a number of colors and a color distribution comprised in the sample video frame; and
  determining the image complexity of the to-be-classified video based on the number of colors and the color distribution of the sample video frame, wherein the image complexity is proportional to the number of colors of the sample video frame and is proportional to a disorder degree of the color distribution of the sample video frame.

13. The non-transitory computer-readable storage medium according to claim 11, wherein extracting the feature map with the resolution corresponding to the image complexity from the to-be-classified video comprises:
  inputting the to-be-classified video and the image complexity into a feature map extraction layer in a preset residual network;
  controlling the feature map extraction layer to determine an actual scaling parameter corresponding to the image complexity, wherein the feature map extraction layer records corresponding relationships between different image complexities and different scaling parameters; and
  controlling the feature map extraction layer to perform a feature map extraction operation on the to-be-classified video based on the actual scaling parameter to obtain the feature map with the resolution corresponding to the image complexity.

14. The non-transitory computer-readable storage medium according to claim 13, wherein the operations further comprise:
  training the feature map extraction layer, wherein the training comprises:
  acquiring a sample video image and a true classification label of the sample video image;
  using the sample video image and the true classification label as an input training sample;
  using an L2 loss function to perform iterative training on an upper limit and a lower limit of an initial scaling parameter until a result converges to obtain a trained scaling parameter; and
  generating the feature map extraction layer based on the trained scaling parameter.

15. The non-transitory computer-readable storage medium according to claim 14, wherein the operations further comprise:
  using a stochastic gradient descent mechanism to adjust an upper limit and a lower limit of a current scaling parameter during the iterative training.

16. The method according to claim 1, wherein the image complexity of the to-be-classified video comprises a disorder degree of color distribution of the image content of the to-be-classified video, and the preset complexity comprises a preset disorder degree of color distribution greater than the disorder degree of the color distribution of the image content of the to-be-classified video,
  wherein reducing the resolution of the to-be-classified video in response to determining that the number of colors per unit area of image content of the to-be-classified video is smaller than the preset number of colors per unit area comprises:
  reducing the resolution of the to-be-classified video in response to determining that the number of colors per unit area of image content of the to-be-classified video is smaller than the preset number of colors per unit area and the disorder degree of color distribution of the image content of the to-be-classified video is smaller than the preset disorder degree of color distribution.

* * * * *